United States Patent [19]

Bianchi

[11] Patent Number: 4,493,760

[45] Date of Patent: Jan. 15, 1985

[54] ELECTROLYTIC CELL HAVING NONPOROUS PARTITION

[75] Inventor: Giuseppe Bianchi, Milan, Italy

[73] Assignee: Industrie Zanussi S.p.A., Pordenone, Italy

[21] Appl. No.: 559,025

[22] Filed: Dec. 7, 1983

[30] Foreign Application Priority Data

Dec. 23, 1982 [IT] Italy ............... 24931 A/82

[51] Int. Cl.$^3$ ............... C25B 13/02; C25B 1/26
[52] U.S. Cl. ............... 204/278; 204/128; 204/133; 204/275
[58] Field of Search ............... 204/128, 133, 278, 275

[56] References Cited

U.S. PATENT DOCUMENTS

| 556,038 | 3/1896 | Wilson | 204/278 |
| 1,862,952 | 6/1932 | Bleecker | 204/278 |
| 1,913,429 | 6/1933 | Crawford | 204/277 |
| 2,098,629 | 11/1937 | Knowlton | 204/278 |
| 4,361,471 | 11/1982 | Kosarek | 204/278 |
| 4,361,474 | 11/1982 | Shoat et al. | 204/278 |

Primary Examiner—R. L. Andrews
Assistant Examiner—Terryence Chapman
Attorney, Agent, or Firm—Wenderoth, Lind & Ponack

[57] ABSTRACT

An electrolytic cell for the production of chlorine gas by the electrolysis of a sodium chloride solution includes a cell body having therein a cathode compartment having a cathode electrode for the formation of hydrogen gas during electrolysis and an anode compartment having an anode electrode for the formation of chlorine gas during electrolysis. Apertures or conduits are provided for charging sodium chloride solution into the compartments, for discharging hydrogen and chlorine gases from the compartments, and for discharging from the compartments solutions resulting from the electrolysis operation. A nonporous wall provides for physical and electrolytic communication between the bottoms of the compartments, while preventing physical and electrolytic communication between the compartments above the bottoms thereof.

7 Claims, 1 Drawing Figure

U.S. Patent   Jan. 15, 1985   4,493,760
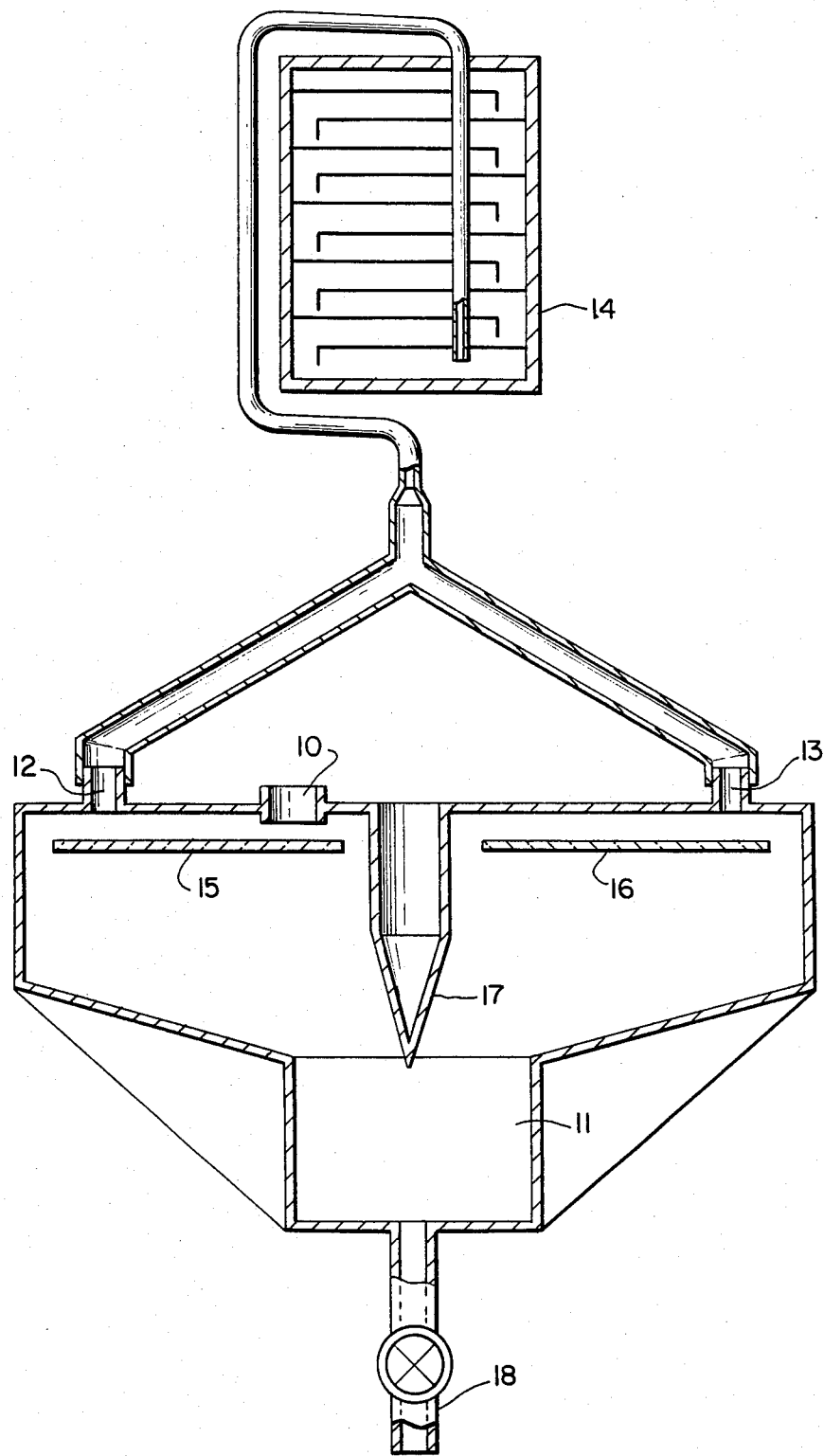

ELECTROLYTIC CELL HAVING NONPOROUS PARTITION

BACKGROUND OF THE INVENTION

The present invention relates to an electrolytic cell for the production of chlorine gas by the electrolysis of a sodium chloride solution, for example an aqueous solution of sodium chloride, particularly for the formation of chlorine water in a washing machine or a dishwasher. More specifically, the present invention relates to such an electrolytic cell intended for intermittent operation and capable of being fully automated in order to produce a small, i.e. of the order of several grams per hour, or modest, i.e. of the order of approximately 1 kilogram per hour, of chlorine water, while avoiding any potential safety hazards or problems.

The cell of the present invention particularly is contemplated for individual use in an appliance such as a washing machine, a dishwasher, etc. However, it is contemplated that the electrolytic cell of the present invention may be employed in a multicell battery, each cell being fitted with an individual in-water absorption device.

In an electrolytic cell the primary purpose of which is to produce chlorine gas by electrolysis, it is necessary to prevent the products of the electrolysis operation in the anode and cathode compartments from completely or partially mixing with one another, since such mixing would result in the formation of sodium hypochlorite.

In electrolytic cells of known construction, prevention of such mixing is achieved by the provision of a porous partition which generally physically separates the two compartments but which allows electrolytic communication therebetween, i.e. which allows ion migration therebetween. This porous partition generally is formed of a material that prevents the solutions formed in the two compartments from again mixing, according to a technique which long has been employed and developed for the production of large quantities of chlorine gas. However, the use of this known type of partition presents certain inherent problems and disadvantages, namely:

The materials employed for the partition can become damaged due to the acidic/basic nature of the solutions with which the partition comes into contact;

The materials of the partition can deteriorate as a result of a rise in temperature due to heat developed during the electrolysis operation;

The electrolysis of a saturated sodium chloride solution can produce clogging of the pores of the partition due to calcareous deposits and impurities contained in the solution; and Clogging of the pores of the partition also may be caused by graphite particles which break away from the electrodes in the compartments of the cell.

SUMMARY OF THE INVENTION

With the above discussion in mind, it is a primary object of the present invention to provide an electrolytic cell for the production of chlorine gas, which thereafter may be employed to form chlorine water, whereby the above and other disadvantages of prior art electrolytic cells may be overcome.

A more specific object of the present invention is to provide such an electrolytic cell which is operable without a porous partition.

These objects are achieved in accordance with the present invention by the provision of an electrolytic cell comprising a cell body including therein a cathode compartment having a cathode electrode for the formation of hydrogen gas during electrolysis and an anode compartment having an anode electrode for the formation of chlorine gas during electrolysis, means for charging a sodium chloride solution into the compartments, means for discharging hydrogen and chlorine gases from the compartments, and means for discharging from the compartments solutions resulting from the electrolysis operation. The structure of the cell body is such as to provide physical and electrolytic communication between the bottoms of the compartments, while at the same time preventing physical and electrolytic communication between the compartments above the bottoms of the compartments.

The gas discharging means may comprise conduits extending from upper portions of the compartments, such conduits leading to a mixing chamber to mix the gases, which then are supplied to an in-water absorption tower for absorbing the chlorine gas in water, thereby forming chlorine water. The charging means may comprise an aperture in the top of the cell body and opening into at least one of the compartments.

In accordance with the present invention, the electrodes in the respective compartments extend substantially horizontally.

The solution discharging means may comprise a conduit leading from the bottom of the cell body. The communication providing and preventing means may comprise a nonporous wall extending from the top of the cell body downwardly to a position spaced from the conduit in the bottom of the cell body. Thereby, electrolytic communication between the two compartments is beneath the bottom of the nonporous wall. A sump may be provided in the bottom of the cell body, the bottom of the nonporous wall being directed toward the sump. The solution discharging conduit extends from the sump. By this arrangement, the more dense solution generated in the cathode compartment during electrolysis is collected in the sump, and the less dense solution generated in the anode compartment during electrolysis is prevented from passing into the cathode compartment by the nonporous wall.

In other words, in accordance with the present invention, the arrangement is such that the conventional porous partition is eliminated, electrolytic communication between the anode and cathode compartments is beneath the bottom of a nonporous wall, and the nonporous wall inherently operates, in conjunction with the sump, to prevent mixing of the anode and cathode solutions which are generated during the electrolysis operation.

BRIEF DESCRIPTION OF THE DRAWING

Other objects, features and advantages of the present invention will be apparent from the following detailed description, taken with the accompanying drawing, wherein the single FIGURE is a schematic cross-sectional view of an electrolytic cell in accordance with the present invention.

DETAILED DESCRIPTION OF THE INVENTION

The drawing illustrates an electrolytic cell according to one embodiment of the present invention. Thus, the cell includes a cell body having therein two compartments each of which has an electrode 15, 16. One electrode is a cathode, and the other electrode is an anode, as will be apparent to those skilled in the art. A solution, for example a heavily concentrated sodium chloride solution (approximately 300 g/1) may be charged into the compartments by means of an aperture 10 in the top of one of the compartments. During an electrolysis operation, hydrogen gas is generated in the cathode compartment, chlorine gas is generated in the anode compartment, and electrolytic solutions are generated in both compartments. Those skilled in the art will understand that the solutions generated in the cathode compartment are more dense than the solutions generated in the anode compartment, and will understand the composition of such solutions. Apertures 12, 13 open from the tops of the two compartments, and conduits connect the gases exiting from such two compartments to an arrangement for enabling mixing of the discharged hydrogen and chlorine gases. The thus mixed gases then are supplied, for example by means of a submerged pipe, to the bottom of an in-water absorption column 14. Thereby, the water in column 14 absorbs chlorine gas, thereby forming chlorine water for use, for example, in a bleaching or sterilizing cycle of a washing machine or dishwasher.

The electrodes 15, 16 are of graphite or other suitable material which may be treated to withstand the electrolytic solution. Those skilled in the art will understand appropriate compositions of electrodes 15, 16. In accordance with the present invention, the electrodes preferably extend generally horizontally within the respective compartments, i.e. the electrodes extend in generally horizontal planes. The electrodes may be provided with slots to promote the elimination of chlorine and hydrogen bubbles that develop during the electrolysis operation on the lower surfaces of the electrodes. Alternatively, the electrodes may be in the form of graphite rods connected in parallel. However, the electrodes may have other shapes as will be apparent to those skilled in the art. At any rate, the general horizontal construction and alignment of the electrodes is advantageous to increase the electrical spacing therebetween. The electrodes furthermore may be plate electrodes which are somewhat inclined in order further to eliminate chlorine and hydrogen gas bubbles, and at the same time to ascertain that the area of attachment between the electrodes and the walls of the cell body do not come into contact with the electrolytic solution, thereby to avoid blow-by, discharges, etc. of the solution.

At the bottom of the cell body is a conduit 18, including a suitable control valve, for discharge of solutions formed during the electrolysis operation. Specifically, a sump 11 may be provided in the bottom of the cell body, with conduit 18 extending from the bottom of sump 11. Sump 11 and conduit 18 operate to collect and carry off the more dense fractions or solution generated in the cathode compartment during the electrolytic operation, thereby preventing transfer of such solution to the anode compartment. In other words, sump 11 and conduit 18 operate by gravity to remove the more dense solution fractions from the cathode compartment and to prevent passage thereof to the anode compartment.

The two compartments are physically and electrolytically separated except at the bottoms of the compartments. This is achieved by a nonporous partition or wall 17, which advantageously may be integrally formed with the cell body. Nonporous wall 17 extends from the top of the cell body downwardly to a position spaced from the conduit 18, and specifically spaced by sump 11. The construction of the bottom of the cell body and the nonporous wall 17 is such that the nonporous wall prevents the less dense fractions of the solution generated in the anode compartment during electrolysis from passing into the cathode compartment. Electrolytic communication between the two compartments is beneath the nonporous wall 17.

Accordingly, in accordance with the present invention, the construction is such that the conventional porous partition is eliminated, and electrolytic communication, i.e. ion migration, occurs beneath the bottom of nonporous wall 17. Therefore, the above noted disadvantages of conventional electrolytic cells employing a porous partition are avoided.

The cell of the present invention, compared with a conventional cell employing a porous partition, has a higher electrical resistance due to the greater distance between the electrodes. From tests, it has been determined that the required power of a cell according to the present invention is approximately twice that required for a conventional cell with a porous partition and having a reduced spacing between the electrodes, for the production of approximately several grams per hour of chlorine gas. This increase of necessary power is not a great disadvantage from the viewpoint of energy consumption which, for this type of production of such relatively small quantities of chlorine gas, still remains quite modest.

However, a more serious possible problem involves the considerable rise in temperature of the solution during an electrolytic operation due to the greater power dissipated for a given ohmic effect. Such an increase in temperature may in fact reach values approaching the boiling point, since as the mobility of the ions and thus the electrolytic current is increased, the higher will be the temperature, such that heating tends to increase rapidly. The primary result of this possible excessive heating of the cell is a reduction in the yield of the electrolysis operation, due to the fact that combination reactions might take place between the products of the electrolysis operation. In fact, it might be possible to ascertain the formation at discrete quantities of hypochlorite, chlorates, etc. Furthermore, such heating leads to a shortened life of the electrodes of the cell.

To control the rise in temperature, and thereby to guarantee a proper functioning of the electrolytic cell, the following and other various procedures can be followed:

Appropriately increase the size of the cell of a constant supply at a suitable voltage, for example 12 volts, in such a way that the heating output is absorbed by the cell without causing the temperature to rise excessively;

Supply the cell with a constant current, with an electronic control system with negative feedback on the primary circuit;

Supply the cell with a constant current with a positive temperature control (PTC) which controls the temperature of the cell, making use of the fact that the electrical resistance of the PTC increases rapidly as the temperature of the cell increases; and Supply the cell with a relatively higher initial voltage during the first phase of operation when the cell is cold, and reducing the voltage in a subsequent, second phase when the cell has become hot in order to lower the current.

Yields of the electrolytic cell illustrated in the drawing and supplied with a constant voltage of 12 volts, under the previously mentioned conditions, are of the order of 80% and therefore are fully satisfactory.

From the above it will be apparent that the present invention completely solves the technical problems of conventional such cells and is particularly suitable for small and medium consumers requiring chlorine water in a non-continuous manner in amounts from a few grams to a few kilograms per hour, such as in washing machines, dishwashers, purification plants, and the like.

It particularly is important to stress that the structure of the cell of the present invention is such as to provide the greatest possible impediment to the circulation of the anode solution from one compartment to the other compartment, and above all to seek to prevent sodium hydroxide produced in one compartment, i.e. the cathode compartment, from coming into contact with and therefore reacting with the chlorine gas developed in the other compartment, for example the anode compartment.

An additional and substantial factor in accordance with the cell of the present invention is that there is developed a dynamic equilibrium of pressures acting on the two compartments. This pressure equilibrium results in a resistance to the mechanical mixing of the solutions in the two compartments, which mechanical mixing would be substantial without the pressure equilibrium.

Although the present invention has been described and illustrated with respect to preferred features thereof, it is to be understood that various modifications and changes may be made to the specifically described and illustrated features without departing from the scope of the present invention.

I claim:

1. An electrolytic cell for the production of chlorine gas by the electrolysis of a sodium chloride solution, particularly for the formation of chlorine water in a washing machine or a dishwasher, said cell comprising:
    a cell body including therein a cathode compartment having a cathode electrode for the formation of hydrogen gas during electrolysis and an anode compartment having an anode electrode for the formation of chlorine gas during electrolysis;
    means for charging sodium chloride solution into said compartments;
    means for discharging hydrogen and chlorine gas from said compartments;
    means for discharging from sid compartments solutions resulting from electrolysis;
    means for providing physical and electrolytic communication between the bottoms of said compartments while preventing physical and elecrolytic communication above said bottoms, said providing and preventing means comprising a nonporous partition; and
    said electrodes extending in generally horizontal planes in the respective said compartments at levels above a lower end of said partition.

2. A cell as claimed in claim 1, wherein said gas discharging means comprises conduits extending from upper portions of said compartments.

3. A cell as claimed in claim 2, further comprising means for mixing the gases from said conduits and for supplying the thus mixed gases to an in-water absorption tower for absorbing the chlorine gas in water, thereby forming chlorine water.

4. A cell as claimed in claim 1, wherein said charging means comprises an aperture in the top of said cell body and opening into at least one of said compartments.

5. A cell as claimed in claim 1, wherein said solution discharging means comprises a conduit leading from the bottom of said cell body.

6. A cell as claimed in claim 5, wherein said partition comprises a nonporous wall extending from the top of said cell body downwardly to a position spaced from said conduit in said bottom of said cell body, electrolytic communication between said compartments being beneath said nonporous wall.

7. A cell as claimed in claim 6, further comprising a sump in said bottom of said cell body, said lower end of said nonporous wall being directed toward said sump, and said solution discharging conduit extending from said sump, whereby said sump collects the more dense solution from said cathode compartment, and said nonporous wall prevents the less dense solution from said anode compartment from passing into said cathode compartment.

* * * * *